US009964352B2

(12) United States Patent
Oelfke

(10) Patent No.: US 9,964,352 B2
(45) Date of Patent: May 8, 2018

(54) SEPARATING CARBON DIOXIDE AND ETHANE FROM A MIXED STREAM

(71) Applicant: Russell H. Oelfke, Houston, TX (US)

(72) Inventor: Russell H. Oelfke, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 562 days.

(21) Appl. No.: 14/376,359

(22) PCT Filed: Mar. 8, 2013

(86) PCT No.: PCT/US2013/029927
§ 371 (c)(1),
(2) Date: Aug. 1, 2014

(87) PCT Pub. No.: WO2013/142100
PCT Pub. Date: Sep. 26, 2013

(65) Prior Publication Data
US 2015/0013377 A1    Jan. 15, 2015

Related U.S. Application Data

(60) Provisional application No. 61/613,606, filed on Mar. 21, 2012.

(51) Int. Cl.
*F25J 1/00* (2006.01)
*B01D 3/36* (2006.01)
*F25J 3/02* (2006.01)

(52) U.S. Cl.
CPC ............ *F25J 1/0027* (2013.01); *B01D 3/36* (2013.01); *F25J 1/00* (2013.01); *F25J 3/0209* (2013.01);
(Continued)

(58) Field of Classification Search
CPC ....... F25J 3/0238; F25J 3/0266; F25J 2205/20
See application file for complete search history.

(56) References Cited

U.S. PATENT DOCUMENTS 2,327,134 A * 8/1943 Schuftan ............... C07C 7/04
62/620
2,621,216 A   12/1952 White ...................... 260/683.3
(Continued)

FOREIGN PATENT DOCUMENTS

DE    3149847    7/1983    ............ B01D 5/00
EP    0133208    2/1985    ............ B01D 53/14
(Continued)

OTHER PUBLICATIONS

Aaron, D. et al. (2005) "Separation of $CO_2$ from Flue Gas: A Review," *Separation Science and Technology*, 40, pp. 321-348.
(Continued)

*Primary Examiner* — Tareq Alosh
(74) *Attorney, Agent, or Firm* — ExxonMobil Upstream Research Company Law Department

(57) ABSTRACT

Embodiments described herein provide methods and systems for separating a mixed ethane and $CO_2$. A method described includes generating a liquid stream including ethane and $CO_2$. The liquid stream is flashed to form an ethane vapor stream and solid $CO_2$. The solid $CO_2$ is accumulated in an accumulation vessel and the gas is removed from the top of the accumulation vessel.

10 Claims, 7 Drawing Sheets

(52) U.S. Cl.
CPC ........... *F25J 3/0233* (2013.01); *F25J 3/0238* (2013.01); *F25J 3/0266* (2013.01); *F25J 2205/02* (2013.01); *F25J 2205/04* (2013.01); *F25J 2205/20* (2013.01); *F25J 2205/90* (2013.01); *F25J 2215/62* (2013.01); *F25J 2245/02* (2013.01); *F25J 2270/90* (2013.01); *F25J 2280/30* (2013.01); *F25J 2280/40* (2013.01); *Y02C 10/12* (2013.01)

(56) References Cited

U.S. PATENT DOCUMENTS

| | | | |
|---|---|---|---|
| 2,843,219 A | 7/1958 | Habgood | 183/114.2 |
| 2,863,527 A | 12/1958 | Herbert et al. | 183/115 |
| 2,960,837 A | 11/1960 | Swenson et al. | 62/24 |
| 3,050,950 A | 8/1962 | Karwat et al. | 62/13 |
| 3,109,726 A | 11/1963 | Karwat | 62/13 |
| 3,349,571 A | 10/1967 | Nebgen | 62/23 |
| 3,393,527 A | 7/1968 | Swensen et al. | 62/16 |
| 3,400,512 A | 9/1968 | McKay | 55/69 |
| 3,421,984 A | 1/1969 | Jensen et al. | 203/41 |
| 3,683,634 A | 8/1972 | Streich | 62/29 |
| 3,705,625 A | 12/1972 | Whitten et al. | 166/252 |
| 3,767,766 A | 10/1973 | Tjoa et al. | 423/220 |
| 3,824,080 A | 7/1974 | Smith et al. | 23/288 |
| 3,842,615 A | 10/1974 | Reigel et al. | 62/171 |
| 3,848,427 A | 11/1974 | Loofbourow | 62/260 |
| 3,895,101 A | 7/1975 | Tsuruta | 423/574 |
| 3,929,635 A | 12/1975 | Buriks et al. | 210/54 |
| 3,933,001 A | 1/1976 | Muska | 62/47 |
| 4,246,015 A | 1/1981 | Styring | 62/12 |
| 4,270,937 A | 6/1981 | Adler | 62/17 |
| 4,280,559 A | 7/1981 | Best | 166/303 |
| 4,281,518 A | 8/1981 | Muller et al. | 62/12 |
| 4,318,723 A | 3/1982 | Holmes et al. | 62/20 |
| 4,319,964 A | 3/1982 | Katz et al. | 202/172 |
| 4,336,233 A | 6/1982 | Appl et al. | 423/224 |
| 4,344,485 A | 8/1982 | Butler | 166/271 |
| 4,351,655 A * | 9/1982 | Styring, Jr. | F25J 3/0209 62/630 |
| 4,370,156 A | 1/1983 | Goddin et al. | 62/17 |
| 4,382,912 A | 5/1983 | Madgavkar et al. | 423/224 |
| 4,383,841 A | 5/1983 | Ryan et al. | 62/17 |
| 4,405,585 A | 9/1983 | Sartori et al. | 423/228 |
| 4,417,449 A | 11/1983 | Hegarty et al. | 62/28 |
| 4,417,909 A | 11/1983 | Weltmer | 62/12 |
| 4,421,535 A | 12/1983 | Mehra | 62/17 |
| 4,441,900 A | 4/1984 | Swallow | 62/29 |
| 4,459,142 A | 7/1984 | Goddin | 62/17 |
| 4,462,814 A | 7/1984 | Holmes et al. | 62/17 |
| 4,511,382 A | 4/1985 | Valencia et al. | 62/20 |
| 4,512,782 A | 4/1985 | Bauer et al. | 55/48 |
| 4,533,372 A | 8/1985 | Valencia et al. | 62/12 |
| 4,551,158 A | 11/1985 | Wagner et al. | 55/46 |
| 4,563,202 A | 1/1986 | Yao et al. | 62/17 |
| 4,592,766 A | 6/1986 | Kumman et al. | 62/18 |
| 4,602,477 A | 7/1986 | Lucadamo | 62/24 |
| 4,609,388 A | 9/1986 | Adler et al. | 62/12 |
| 4,636,334 A | 1/1987 | Skinner et al. | 252/377 |
| 4,695,672 A | 9/1987 | Bunting | 585/867 |
| 4,697,642 A | 10/1987 | Vogel | 166/263 |
| 4,710,213 A | 12/1987 | Sapper et al. | 62/28 |
| 4,717,408 A | 1/1988 | Hopewell | 62/20 |
| 4,720,294 A | 1/1988 | Lucadamo et al. | 62/31 |
| 4,747,858 A | 5/1988 | Gottier | 62/17 |
| 4,761,167 A | 8/1988 | Nicholas et al. | 62/17 |
| 4,762,543 A | 8/1988 | Pantermuehl et al. | 62/28 |
| 4,769,054 A | 9/1988 | Steigman | 62/12 |
| 4,822,393 A | 4/1989 | Markbreiter et al. | 62/17 |
| 4,831,206 A | 5/1989 | Zarchy | 585/737 |
| 4,923,493 A | 5/1990 | Valencia et al. | 62/13 |
| 4,927,498 A | 5/1990 | Rushmere | 162/168.3 |
| 4,935,043 A | 6/1990 | Blanc et al. | 62/20 |
| 4,954,220 A | 9/1990 | Rushmere | 162/168.3 |
| 4,972,676 A | 11/1990 | Sakai | 62/18 |
| 4,976,849 A | 12/1990 | Soldati | 208/351 |
| 5,011,521 A | 4/1991 | Gottier | 62/11 |
| 5,062,270 A | 11/1991 | Haut et al. | 62/12 |
| 5,120,338 A | 6/1992 | Potts et al. | 62/12 |
| 5,137,550 A | 8/1992 | Hegarty et al. | 55/43 |
| 5,152,927 A | 10/1992 | Rivers | 252/344 |
| 5,233,837 A | 8/1993 | Callahan | 62/38 |
| 5,240,472 A | 8/1993 | Sircar | 95/52 |
| 5,247,087 A | 9/1993 | Rivers | 544/357 |
| 5,265,428 A | 11/1993 | Valencia et al. | 62/36 |
| 5,335,504 A | 8/1994 | Durr et al. | 62/20 |
| 5,345,771 A | 9/1994 | Dinsmore | 62/18 |
| 5,567,396 A | 10/1996 | Perry et al. | 422/190 |
| 5,620,144 A | 4/1997 | Strock et al. | 239/557 |
| 5,643,460 A | 7/1997 | Marble et al. | 210/705 |
| 5,681,360 A * | 10/1997 | Siwajek | B01D 53/1418 48/127.3 |
| 5,700,311 A | 12/1997 | Spencer | 95/236 |
| 5,720,929 A | 2/1998 | Minkkinen et al. | 422/190 |
| 5,819,555 A | 10/1998 | Engdahl | 62/637 |
| 5,820,837 A | 10/1998 | Marjanovich et al. | 423/220 |
| 5,899,274 A | 5/1999 | Frauenfeld et al. | 166/401 |
| 5,956,971 A | 9/1999 | Cole et al. | 62/623 |
| 5,964,985 A | 10/1999 | Wootten | 201/40 |
| 5,983,663 A | 11/1999 | Sterner | 62/620 |
| 6,053,007 A | 4/2000 | Victory et al. | 62/619 |
| 6,082,133 A | 7/2000 | Barclay et al. | 62/619 |
| 6,082,373 A | 7/2000 | Sakurai et al. | 134/1 |
| 6,162,262 A | 12/2000 | Minkkinen et al. | 23/295 |
| 6,223,557 B1 | 5/2001 | Cole | 62/613 |
| 6,240,744 B1 | 6/2001 | Agrawal et al. | 62/643 |
| 6,267,358 B1 | 7/2001 | Gohara et al. | 261/110 |
| 6,270,557 B1 | 8/2001 | Millet et al. | 95/96 |
| 6,274,112 B1 | 8/2001 | Moffett et al. | 423/338 |
| 6,336,334 B1 | 1/2002 | Minkkinen et al. | 62/123 |
| 6,374,634 B2 | 4/2002 | Gallarda et al. | 62/620 |
| 6,401,486 B1 | 6/2002 | Lee et al. | 62/630 |
| 6,416,729 B1 | 7/2002 | Deberry et al. | 423/573.1 |
| 6,442,969 B1 | 9/2002 | Rojey et al. | 62/618 |
| 6,500,982 B1 | 12/2002 | Hale et al. | 562/600 |
| 6,505,683 B2 | 1/2003 | Minkkinen et al. | 166/266 |
| 6,516,631 B1 | 2/2003 | Trebble | 62/630 |
| 6,517,801 B2 | 2/2003 | Watson et al. | 423/574.1 |
| 6,539,747 B2 | 4/2003 | Minta et al. | 62/620 |
| 6,565,629 B1 | 5/2003 | Hayashida et al. | 95/211 |
| 6,605,138 B2 | 8/2003 | Frondorf | 95/160 |
| 6,631,626 B1 | 10/2003 | Hahn | 62/612 |
| 6,632,266 B2 | 10/2003 | Thomas et al. | 95/49 |
| 6,662,872 B2 | 12/2003 | Gutek et al. | 166/272.4 |
| 6,708,759 B2 | 3/2004 | Leaute et al. | 166/272.4 |
| 6,711,914 B2 | 3/2004 | Lecomte | 62/625 |
| 6,735,979 B2 | 5/2004 | Lecomte et al. | 62/611 |
| 6,755,251 B2 | 6/2004 | Thomas et al. | 166/265 |
| 6,755,965 B2 | 6/2004 | Pironti et al. | 208/347 |
| 6,818,194 B2 | 11/2004 | DeBerry et al. | 423/228 |
| 6,946,017 B2 | 9/2005 | Leppin et al. | 95/139 |
| 6,958,111 B2 | 10/2005 | Rust et al. | 202/158 |
| 6,962,061 B2 | 11/2005 | Wilding et al. | 62/613 |
| 7,001,490 B2 | 2/2006 | Wostbrock et al. | 203/1 |
| 7,004,985 B2 | 2/2006 | Wallace et al. | 48/198.3 |
| 7,066,986 B2 | 6/2006 | Haben et al. | 95/99 |
| 7,073,348 B2 | 7/2006 | Clodic et al. | 62/532 |
| 7,121,115 B2 | 10/2006 | Lemaire et al. | 62/625 |
| 7,128,150 B2 | 10/2006 | Thomas et al. | 166/266 |
| 7,128,276 B2 | 10/2006 | Nilsen et al. | 236/124 |
| 7,152,431 B2 | 12/2006 | Amin et al. | 62/637 |
| 7,211,128 B2 | 5/2007 | Thomas et al. | 95/135 |
| 7,211,701 B2 | 5/2007 | Muller et al. | 568/853 |
| 7,219,512 B1 | 5/2007 | Wilding et al. | 62/617 |
| 7,285,225 B2 | 10/2007 | Copeland et al. | 210/785 |
| 7,325,415 B2 | 2/2008 | Amin et al. | 62/541 |
| 7,424,808 B2 | 9/2008 | Mak | 62/625 |
| 7,437,889 B2 | 10/2008 | Roberts et al. | 62/619 |
| 7,442,231 B2 | 10/2008 | Landrum | 95/45 |
| 7,442,233 B2 | 10/2008 | Mitariten | 95/123 |
| 7,493,779 B2 | 2/2009 | Amin | 62/617 |
| 7,536,873 B2 | 5/2009 | Nohlen | 62/644 |
| 7,550,064 B2 | 6/2009 | Bassler et al. | 203/29 |
| 7,575,624 B2 | 8/2009 | Cartwright et al. | 95/51 |

(56) References Cited

U.S. PATENT DOCUMENTS

| | | | |
|---|---|---|---|
| 7,597,746 B2 | 10/2009 | Mak et al. | 95/169 |
| 7,635,408 B2 | 12/2009 | Mak et al. | 95/187 |
| 7,637,984 B2 | 12/2009 | Adamopoulos | 95/45 |
| 7,637,987 B2 | 12/2009 | Mak | 95/160 |
| 7,641,717 B2 | 1/2010 | Gal | 95/187 |
| 7,662,215 B2 | 2/2010 | Sparling et al. | 95/172 |
| 7,691,239 B2 | 4/2010 | Kister et al. | 203/2 |
| 7,722,289 B2 | 5/2010 | Leone et al. | 405/53 |
| 7,729,976 B2 | 6/2010 | Hill et al. | 705/37 |
| 7,770,872 B2 | 8/2010 | Delatour | 261/110 |
| 7,795,483 B2 | 9/2010 | Kulprathipanja et al. | 585/24 |
| 7,806,965 B2 | 10/2010 | Stinson | 95/187 |
| 7,814,975 B2 | 10/2010 | Hagen et al. | 166/257 |
| 7,879,135 B2 | 2/2011 | Ravikumar | 95/11 |
| 7,901,583 B2 | 3/2011 | McColl et al. | 210/710 |
| 7,955,496 B2 | 6/2011 | Iqbal et al. | 208/129 |
| 8,002,498 B2 | 8/2011 | Leone et al. | 405/53 |
| 8,020,408 B2 | 9/2011 | Howard et al. | 62/646 |
| 8,133,764 B2 | 3/2012 | Dirks et al. | 438/124 |
| 8,303,685 B2 | 11/2012 | Schubert et al. | 95/181 |
| 8,308,849 B2 | 11/2012 | Gal | 95/187 |
| 8,312,738 B2 | 11/2012 | Singh et al. | 62/629 |
| 8,372,169 B2 | 2/2013 | Tsangaris et al. | 48/120 |
| 8,388,832 B2 | 3/2013 | Moffett et al. | 208/390 |
| 8,428,835 B2 | 4/2013 | Habert et al. | 701/54 |
| 8,475,572 B2 | 7/2013 | Prast et al. | 95/269 |
| 8,529,662 B2 | 9/2013 | Kelley et al. | 95/96 |
| 2002/0174687 A1 | 11/2002 | Cai | 65/158 |
| 2002/0189443 A1 | 12/2002 | McGuire | 95/32 |
| 2003/0181772 A1 | 9/2003 | Meyer et al. | 585/324 |
| 2004/0035148 A1* | 2/2004 | Whitlock | C01B 21/20 62/617 |
| 2006/0144079 A1* | 7/2006 | Amin | B08B 9/00 62/532 |
| 2006/0207946 A1 | 9/2006 | McColl et al. | 210/733 |
| 2006/0239879 A1 | 10/2006 | Lallemand et al. | 423/210 |
| 2007/0056317 A1 | 3/2007 | Amin et al. | 62/532 |
| 2007/0144943 A1 | 6/2007 | Lemaire et al. | 208/208 |
| 2007/0277674 A1 | 12/2007 | Hirano et al. | 95/290 |
| 2008/0034789 A1 | 2/2008 | Fieler et al. | 62/623 |
| 2008/0091316 A1 | 4/2008 | Szczublewski | 701/36 |
| 2008/0092589 A1 | 4/2008 | Trainer et al. | 62/640 |
| 2008/0307827 A1 | 12/2008 | Hino et al. | 62/634 |
| 2009/0023605 A1 | 1/2009 | Lebl et al. | 506/27 |
| 2009/0220406 A1 | 9/2009 | Rahman | 423/437.1 |
| 2009/0266107 A1* | 10/2009 | Singh | B01D 3/14 62/617 |
| 2010/0011809 A1 | 1/2010 | Mak | 62/620 |
| 2010/0018248 A1 | 1/2010 | Fieler et al. | 62/617 |
| 2010/0024472 A1 | 2/2010 | Amin et al. | 62/541 |
| 2010/0107687 A1 | 5/2010 | Andrian et al. | 62/620 |
| 2010/0132405 A1 | 6/2010 | Nilsen | 62/611 |
| 2010/0147022 A1 | 6/2010 | Hart et al. | 62/601 |
| 2010/0187181 A1 | 7/2010 | Sortwell | 210/726 |
| 2010/0310439 A1 | 12/2010 | Brok et al. | 423/222 |
| 2011/0132034 A1 | 6/2011 | Beaumont et al. | 62/620 |
| 2011/0154856 A1 | 6/2011 | Andrian et al. | 62/618 |
| 2011/0168019 A1 | 7/2011 | Northrop et al. | 95/186 |
| 2011/0192190 A1 | 8/2011 | Andrian et al. | 62/617 |
| 2011/0265512 A1 | 11/2011 | Bearden et al. | 62/617 |
| 2012/0006055 A1 | 1/2012 | Van Santen et al. | 62/618 |
| 2012/0031143 A1 | 2/2012 | Van Santem et al. | 62/617 |
| 2012/0031144 A1 | 2/2012 | Northrop et al. | 62/617 |
| 2012/0079852 A1 | 4/2012 | Northrop et al. | 62/620 |
| 2012/0125043 A1 | 5/2012 | Cullinane et al. | 62/620 |
| 2012/0204599 A1 | 8/2012 | Northrop et al. | 62/617 |
| 2013/0074541 A1 | 3/2013 | Kaminsky et al. | 62/601 |
| 2013/0098105 A1 | 4/2013 | Northrop | 62/617 |
| 2013/0192296 A1* | 8/2013 | Betting | B01D 53/002 62/602 |
| 2014/0137599 A1 | 5/2014 | Oelfke et al. | 62/619 |

FOREIGN PATENT DOCUMENTS

| | | | |
|---|---|---|---|
| EP | 0508244 | 10/1992 | B01D 53/34 |
| EP | 1338557 | 3/2005 | C01B 17/04 |
| WO | WO 2002/032536 | 4/2002 | B01F 13/00 |
| WO | WO 2002/039038 | 5/2002 | F25J 3/06 |
| WO | WO 2004/047956 | 6/2004 | B01D 53/14 |
| WO | WO 2008/034789 | 3/2008 | G10K 11/00 |
| WO | WO 2008/095258 | 8/2008 | F25J 3/02 |
| WO | WO 2008/152030 | 12/2008 | B01D 53/00 |
| WO | WO 2009/023605 | 2/2009 | C10G 21/00 |
| WO | WO 2009/029353 | 3/2009 | E21B 43/00 |
| WO | WO 2009/087206 | 7/2009 | B01D 53/00 |
| WO | WO 2010/023238 | 3/2010 | F25J 3/06 |
| WO | WO 2010/052299 | 5/2010 | B01D 53/00 |
| WO | WO 2010/136442 | 12/2010 | B01D 53/00 |
| WO | WO 2011/026170 | 3/2011 | C10L 3/10 |
| WO | WO 2011/090553 | 7/2011 | B01D 53/00 |
| WO | WO 2013/095828 | 6/2013 | B01D 53/00 |

OTHER PUBLICATIONS

Amin, R. (2003) "Advanced Mini Natural Gas Liquefier," *LNG Journal*, Mar.-Apr. 2003, pp. 20-23.

Black, S. (2006) "Chilled Ammonia Process for CO2 Capture," *Alstom Position Paper*, Nov. 2006, 6 pgs.

Ciulla, Vincent (2007) "How the Engine Works," About.com, Mar. 21 2007, [retrieved from the internet on Aug. 17, 2012]. <URL: http://autorepair.about.com/cs/generalinfo/a/aa060500a.html>.

"Cryogenics" *Science Clarified*, May 2, 2006 [retrieved from the internet on Aug. 17, 2012]. <URL: http://www.scienceclarified.com/Co-Di/Cryogenics.html>.

Denton, R. D. et al. (1985) "Integrated Low Temperature Processing of Sour Natural Gas," *Gas Processors Assoc., 64th Ann. Conv.*, pp. 92-96.

Guccione, E. (1963) "New Approach to Recovery of Helium from Natural Gas," *Chem. Engr.*, Sep. 30, 1963, pp. 76-78.

Hassan, S. M. N. (2005) "Techno-Economic Study of $CO_2$ Capture Process for Cement Plants," *University of Waterloo—Thesis*.

Haut, R. C. et al. (1988) "Development and Application of the Controlled Freeze Zone Process," SPE 17757, *SPE Gas Tech. Symp.—Dallas, TX*, pp. 435-443.

Haut, R. C. et al. (1988) "Development and Application of the Controlled Freeze Zone Process," OSEA 88197, *7th Offshore So. East Asia Conf.*, Singapore, Feb. 1988, pp. 840-848.

Haut, R. C. et al. (1989) "Development and Application of the Controlled Freeze Zone Process," *SPE Production Engineering*, Aug. 1989, pp. 265-271.

Im, U. K. et al. (1971) "Heterogeneous Phase Behavior of Carbon Dioxide in n-Hexane and n-Heptane at Low Temperatures," *Jrnl. of Chem. Engineering Data*, v.16.4, pp. 412-415.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.

Northrop, P. Scott et al. (2004) "Cryogenic Sour Gas Process Attractive for Acid Gas Injection Applications," *83rd Ann. Gas Processors Assoc. Convention, New Orleans, LA.*, pp. 1-8 (XP007912217).

Pagcatipunan, C. et al. (2005) "Maximize the Performance of Spray Nozzle Systems," *CEP Magaaine*, Dec. 2005, pp. 38-44.

Reyes, S. C. et al. (1997) "Frequency Modulation Methods for Diffusion and Adsorption Measurements in Porous Solids," *J. Phys. Chem. B*, v.101, pp. 614-622.

Rubin, E. S. et al. (2002) "A Technical, Economic and Environmental Assessment of Amine-based CO2 Capture Technology for Power Plant Greenhouse Gas Control," *U.S. Dept. of Energy*, Oct. 2002, DOE/DE-FC26-00NT40935, 26 pages.

Spero, C. (2007) "Callide Oxyfuel Project," *CS Energy, CLET Seminar*, Jul. 12, 2007, 9 pages.

Thomas, E. R. et al. (1987) "Conceptual Studies Using the Controlled Freeze Zone (CFZ) Process," *AIChE Summer Nat'l Mtg.*, Aug. 16-19, 1987.

(56) References Cited

OTHER PUBLICATIONS

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.

Victory, D. J. et al. (1987) "The CFZ Process: Direct Methane-Carbon Dioxide Fractionation," *66$^{th}$ Ann. GPA Convention*, Mar. 16-18, Denver, CO.

Wilson, R.W. et al. (1968) "Helium: Its Extraction and Purification," *Journ. Petrol. Tech.*, v. 20, pp. 341-344.

\* cited by examiner

400

500

US 9,964,352 B2

SEPARATING CARBON DIOXIDE AND ETHANE FROM A MIXED STREAM

CROSS-REFERENCE TO RELATED APPLICATION

This application is the National Stage of International Application No. PCT/US2013/029927, filed Mar. 8, 2013, which claims the priority benefit of U.S. Provisional Patent Application No. 61/613,606 filed Mar. 21, 2012 entitled SEPARATING CARBON DIOXIDE AND ETHANE FROM A MIXED STREAM, the entirety of which is incorporated by reference herein.

FIELD OF THE INVENTION

The present application is directed to the separation of carbon dioxide from ethane, wherein the liquid acid gas stream is composed primarily of hydrogen sulphide and carbon dioxide.

BACKGROUND

Natural gas reservoirs may often contain high levels of acid gases, such as $CO_2$. In these cases, a cryogenic process may provide an efficacious way to separate the acid gases from the methane. The cryogenic process could include a simple bulk fractionation, a Ryan-Holmes process, or a more complex cryogenic fractionation process. The cryogenic processes separate methane from $CO_2$ by condensation and fractionation, and can produce the acid gas in a liquid phase for efficient disposal via pumping. However, in the cryogenic processes heavier hydrocarbons are separated with the $CO_2$ in a single liquid stream. Often, the $CO_2$ will be immediately reinjected for disposal, where the mixture will not cause any problems.

In some locations, a natural gas reservoir contains high levels of $CO_2$. It is advantageous in these cases to use a cryogenic process to separate the $CO_2$ from the methane. The cryogenic process could be simple bulk fractionation, a Ryan-Holmes, or a Controlled Freeze Zone (CFZ™) process. These processes separate methane from $CO_2$ by condensation I fractionation, and can provide the $CO_2$ as a liquid for efficient disposal. However, in these processes all hydrocarbons heavier than methane (C2+ or "ethane plus") are also condensed and separated with the $CO_2$. Normally, the $CO_2$ will be reinjected for disposal, but the hydrocarbons are valuable and it is preferred that they be recovered for sale.

Separation of the heavier hydrocarbons can be performed by fractionation. However, ethane forms an azeotropic mixture with $CO_2$, as discussed with respect to FIG. 1. The azeotropic prevents separation by normal techniques.

FIG. 1 is a temperature-composition phase plot 100 showing the equilibrium concentrations of $CO_2$ in a mixture with ethane at 4,137 kilopascals (kPa, 600 psia). The x-axis 102 indicates the mole fraction of $CO_2$, while the y-axis 104 represents the temperature in degrees Celsius (° C.). The concentration of the $CO_2$ in the vapor phase 106 matches the concentration of the $CO_2$ in the liquid phase 108 at about 70% $CO_2$/30% ethane, as indicated by an arrow 110. This prevents separation-by-fractionation across the azeotrope (left to right, or right to left).

FIG. 2 is a temperature-composition phase plot 200 showing the equilibrium concentrations of $CO_2$ in a mixture with ethane at 689.5 kPa (100 psia). Like numbered items are as described with respect to FIG. 1. As this plot 200 shows, concentration of the $CO_2$ in the vapor phase 106 approaches the concentration of the $CO_2$ in the liquid phase 108 at about 60% $CO_2$/40% ethane, as indicated by an arrow 202. This prevents separation-by-fractionation across the azeotrope (left to right, or right to left). As these plots 100 and 200 indicate, complete separation by fractionation cannot be achieved without some additional separation processes.

Since the vapor and liquid compositions are equal at some point (70% $CO_2$ at 4,137 kPa and 60% $CO_2$ at 689.5 kPa), complete separation by fractionation cannot be achieved without some additional factor. Current practice for $CO_2$ I ethane separation includes various methods. For example, a heavy component (lean oil) can be added, which preferentially absorbs the ethane. This is called "extractive distillation." As another example, two-pressure fractionation can be used to exploit the small difference in the azeotropic composition between different pressures, for example, using two fractionators to fractionate at both 4,137 kPa and 689.5 kPa. This requires very large recycle stream, large fractionation systems, and is very energy intensive. Methods to exploit other physical and chemical properties (not dependent on vapor-liquid equilibria) can be used in conjunction with fractionation to achieve separation. These methods may include the use of amines in a chemical reaction with $CO_2$, gas permeation membranes, or molecular sieves.

For example, U.S. Pat. No. 4,246,015, to Styring, discloses a method for separating carbon dioxide and ethane based on washing ethane from frozen carbon dioxide. The separation is accomplished by freezing the carbon dioxide in a carbon dioxide and ethane mixture and washing the ethane from the solid carbon dioxide with a liquid hydrocarbon having at least three carbon atoms. The freezing process may be preceded by distillation of a carbon dioxide-ethane mixture to form an azeotropic mixture. A subsequent distillation may be used to separate the wash hydrocarbon from the carbon dioxide. In addition, if desired, the ethane-wash hydrocarbon mixture may be similarly separated in a subsequent distillation stage.

U.S. Patent Application Publication No. 2002/0189443, by McGuire, discloses a method of removing carbon dioxide or hydrogen sulfide from a high pressure mixture with methane. The high pressure gas is expanded through a flow channel having a convergent section followed by a divergent section with an intervening throat which functions as an aerodynamic expander. The flow channel is operated at temperatures low enough to result in the formation of solid carbon dioxide and solid hydrogen sulfide particles, which increases the efficiency of carbon dioxide and hydrogen sulfide removal.

International Patent Publication No. WO/2008/095258, by Hart, discloses a method for decreasing the concentration on carbon dioxide in a natural gas feed stream containing ethane and $C_3+$ hydrocarbons. The process involves cooling the natural gas feed stream under a first set of conditions to produce a liquid stream of carbon dioxide, ethane and $C_3+$ hydrocarbons and a gas stream having a reduced carbon dioxide concentration. The liquid stream is separated from the gas stream, and $C_3+$ hydrocarbons may be separated from the liquid stream. The gas stream is then cooled under a second set of conditions to produce a sweetened natural gas stream and a second liquid containing liquid carbon dioxide and/or carbon dioxide solids. The sweetened natural gas stream is separated from the second liquid.

International Patent Publication No. WO/2008/084945, by Prast, discloses a method and assembly for removing and solidifying carbon dioxide from a fluid stream. The assembly has a cyclonic fluid separator with a tubular throat portion arranged between a converging fluid inlet section and a diverging fluid outlet section and a swirl creating device. The separation vessel has a tubular section positioned on and in connection with a collecting tank. A fluid stream with carbon dioxide is injected into the separation assembly. A swirling motion is imparted to the fluid stream so as to induce outward movement. The swirling fluid stream is then expanded such that components of carbon dioxide in a meta-stable state within the fluid stream are formed. Subsequently, the outward fluid stream with the components of carbon dioxide is extracted from the cyclonic fluid separator and provided as a mixture to the separation vessel. The mixture is then guided through the tubular section towards the collecting tank, while providing processing conditions such that solid carbon dioxide is formed. Finally, solidified carbon dioxide is extracted.

Each of these methods presents a drawback. For example, using a lean oil contaminates the ethane, and requires large amounts of heat, for regenerating the lean oil. Further, large lean oil circulation rates are needed and the technique does not allow complete ethane recovery. Two-pressure fractionation systems require very large recycle streams and equipment sizes, increasing costs. Techniques that use amines, membranes, and mole sieves all release the $CO_2$ as a vapor at low pressure, increasing the cost of disposal. Finally, the expander separation devices generate the $CO_2$ as a solid. Thus, there is a need for a better method of separating $CO_2$ and ethane.

SUMMARY

An embodiment described herein provides a method for separating a mixed ethane and $CO_2$ stream. The method includes generating a liquid stream comprising ethane and $CO_2$ and passing the liquid stream through a flash valve into an accumulation vessel, forming a gas that is enhanced in ethane, and forming solid $CO_2$. The solid $CO_2$ is accumulated in the accumulation vessel, and the gas is removed from the top of the accumulation vessel.

Another embodiment provides a system for separating a mixed stream of $CO_2$ and ethane. The system includes a flash valve configured to isoenthalpically flash the mixed stream forming solid $CO_2$ and a vapor stream enhanced in ethane, and an accumulation vessel configured to capture the solid $CO_2$.

Another embodiment provides a method for purifying a natural gas stream. The method includes dehydrating the natural gas stream and cryogenically separating the natural gas stream into a methane rich fraction, a natural gas liquids fraction, and an azeotropic stream in a cryogenic purification system. The azeotropic stream is flashed to form solid $CO_2$ and an ethane enriched vapor stream. The solid $CO_2$ is removed from the ethane enriched vapor stream in an accumulation vessel and the ethane enriched vapor stream is purified to form a liquid ethane product.

BRIEF DESCRIPTION OF THE DRAWINGS

The advantages of the present techniques are better understood by referring to the following detailed description and the attached drawings, in which.

DETAILED DESCRIPTION

Figure 1:
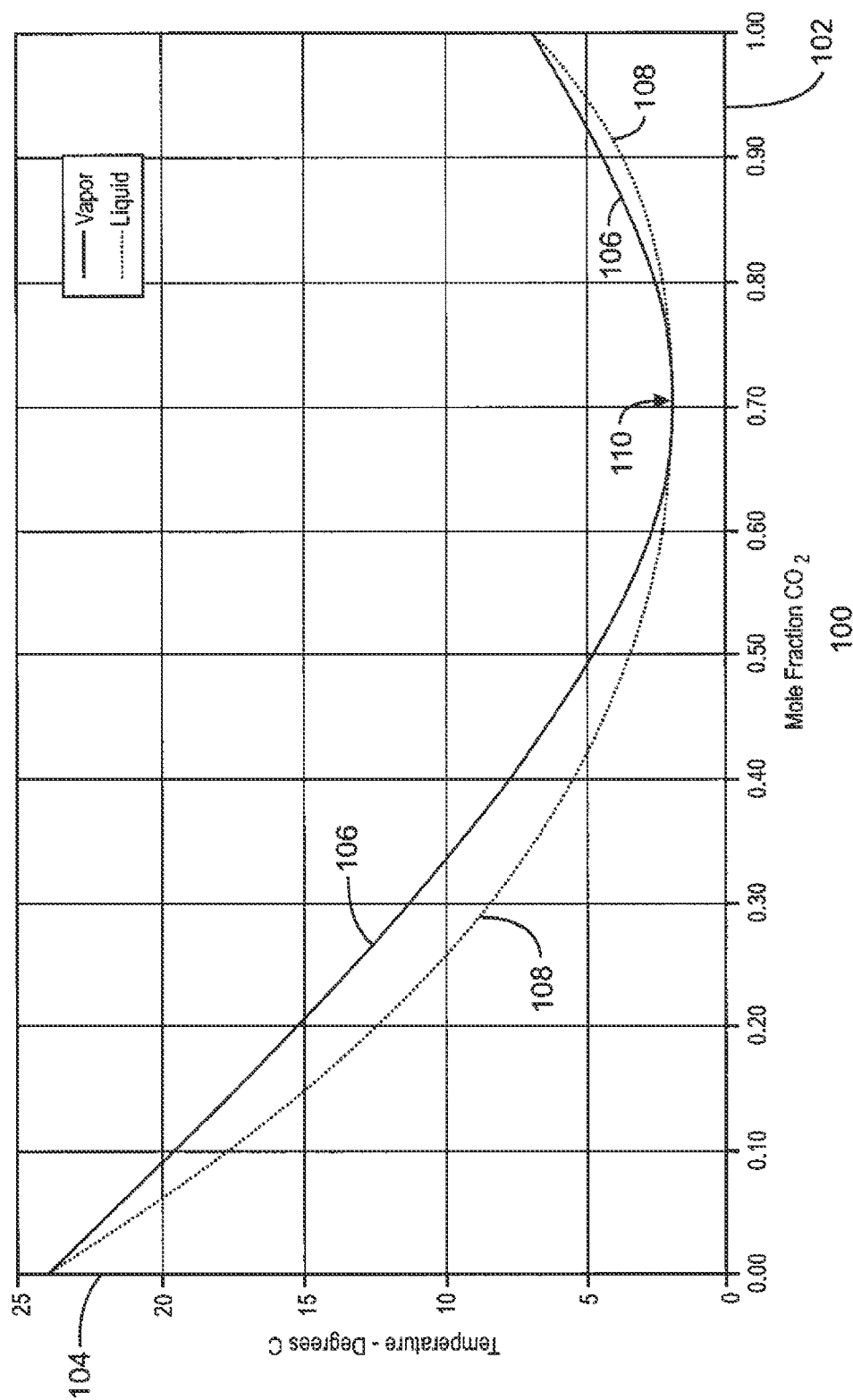
FIG. 1 is a temperature-composition phase plot showing the equilibrium concentrations of $CO_2$ in a mixture with ethane at 4,137 kPa.
Figure 2:
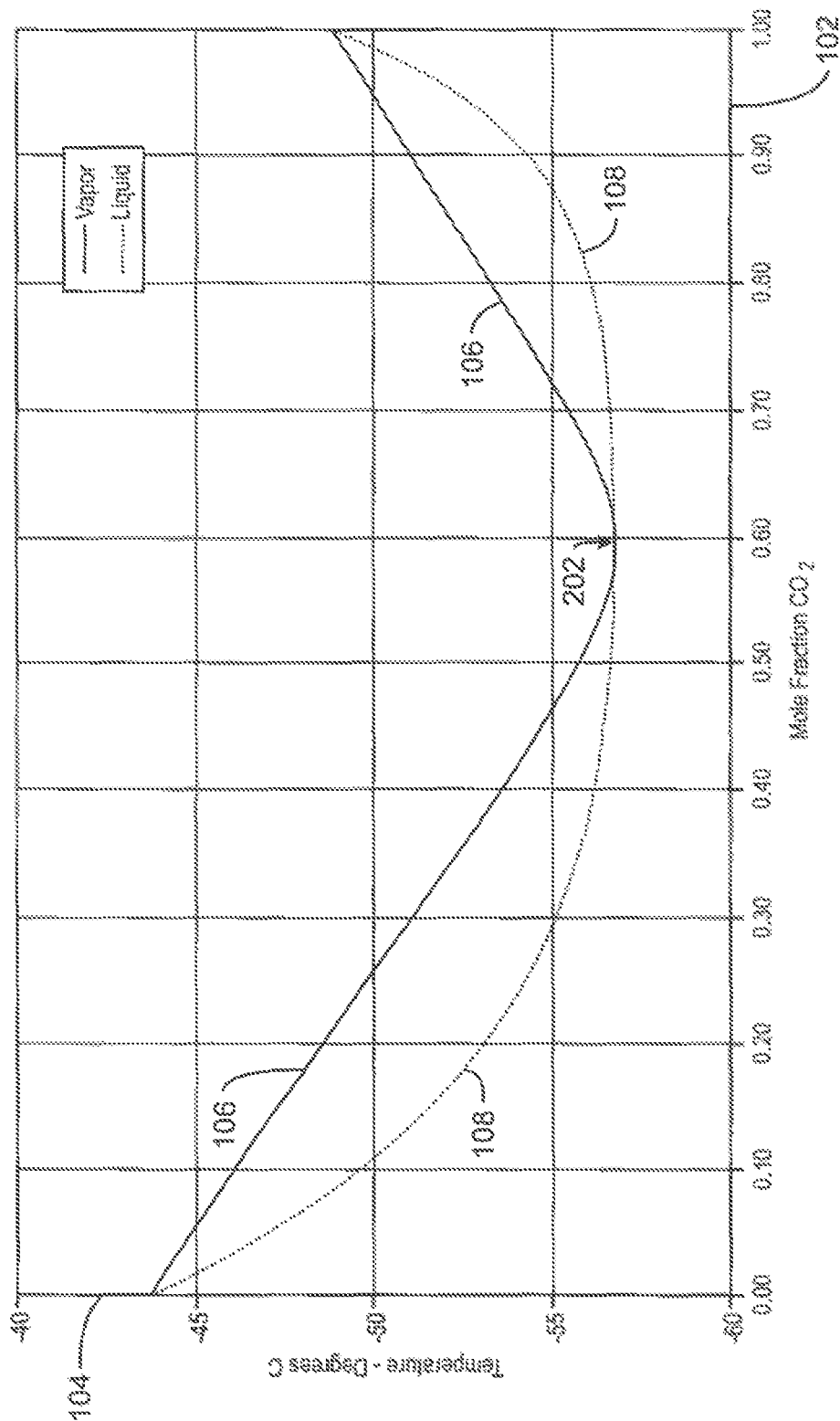
FIG. 2 is a temperature-composition phase plot showing the equilibrium concentrations of $CO_2$ in a mixture with ethane at 689.5 kPa.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Acid gases" are contaminants that are often encountered in natural gas streams. Typically, these gases include carbon dioxide ($CO_2$) and hydrogen sulfide ($H_2S$), although any number of other contaminants may also form acids. Acid gases are commonly removed by contacting the gas stream with an absorbent, such as an amine, which may react with the acid gas. When the absorbent becomes acid-gas "rich," a desorption step can be used to separate the acid gases from the absorbent. The "lean" absorbent is then typically recycled for further absorption. As used herein a "liquid acid gas stream" is a stream of acid gases that are condensed into the liquid phase, for example, including $CO_2$ dissolved in $H_2S$ and vice-versa.

An "azeotrope" or "azeotropic mixture" is a system of two or more components in which the liquid composition and vapor composition are equal at a certain pressure and temperature. In practice, this means that the components of an azeotropic mixture are constant-boiling at that pressure and temperature and generally cannot be separated during a phase change.

As used herein, a "column" is a separation vessel in which a counter current flow is used to isolate materials on the basis of differing properties. In an absorbent column, a physical solvent is injected into the top, while a mixture of gases to be separated is flowed through the bottom. As the gases flow upwards through the falling stream of absorbent, one gas species is preferentially absorbed, lowering its concentration in the vapor stream exiting the top of the column. In a fractionation column, liquid and vapor phases are counter-currently contacted to effect separation of a fluid mixture based on boiling points or vapor pressure differences. The high vapor pressure, or lower boiling, component will tend to concentrate in the vapor phase whereas the low vapor pressure, or higher boiling, component will tend to concentrate in the liquid phase.

"Cold box" refers to an insulated enclosure which encompasses sets of process equipment such as heat exchangers, columns, and phase separators. Such sets of process equipment may form the whole or part of a given process.

"Compressor" refers to a device for compressing a working gas, including gas-vapor mixtures or exhaust gases. Compressors can include pumps, compressor turbines, reciprocating compressors, piston compressors, rotary vane or screw compressors, and devices and combinations capable of compressing a working gas.

"Cryogenic distillation" has been used to separate carbon dioxide from methane since the relative volatility between methane and carbon dioxide is reasonably high. The overhead vapor is enriched with methane and the bottoms product is enriched with carbon dioxide and other heavier hydrocarbons. Cryogenic distillation processing requires the proper combination of pressure and temperature to achieve the desired product recovery.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state.

"Heat exchanger" refers to any equipment arrangement adapted to allow the passage of heat energy from one or more streams to other streams. The heat exchange may be either direct (e.g., with the streams in direct contact) or indirect (e.g. with the streams separated by a mechanical barrier). The streams exchanging heat energy may be one or more lines of refrigerant, heating, or cooling utilities, one or more feed streams, or one or more product streams. Examples include a shell-and-tube heat exchanger, a cryogenic spool-wound heat exchanger, or a brazed aluminum-plate fin type, among others.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to organic materials that are harvested from hydrocarbon containing sub-surface rock layers, termed reservoirs. For example, natural gas is normally composed primarily of the hydrocarbon methane.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas will also typically contain ethane ($C_2$), higher molecular weight hydrocarbons, one or more acid gases (such as carbon dioxide, hydrogen sulfide, carbonyl sulfide, carbon disulfide, and mercaptans), and minor amounts of contaminants such as water, helium, nitrogen, iron sulfide, wax, and crude oil.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gauge pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

A "separation vessel" is a vessel wherein an incoming feed is separated into individual vapor and liquid fractions. A separation vessel may include a flash drum in which a stream is flashed to form vapor and liquid components. The vapor component is removed from an upper outlet, while the liquid component is removed from a lower outlet.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Methods and systems described herein use the heat of vaporization of ethane to freeze entrained $CO_2$ to a solid form, allowing a substantially complete separation of the components. The process works by taking a liquid mixture of $CO_2$ and ethane, chilling it as much as possible without forming solid $CO_2$, and, then, reducing the mixture's pressure by flashing it into a solids-accumulation vessel. The pressure of the flash is selected to vaporize all the ethane by heat liberated from the freezing $CO_2$ (heat of fusion). Solid $CO_2$ deposits in the vessel, while the vapor stream, now enriched in ethane above the azeotrope, can be distilled by using conventional fractionation for partial ethane recovery. The distillation overhead stream (at the azeotropic composition again) is chilled and recycled back to the feed, as liquid $CO_2$ I Ethane. The process may be further understood with respect to FIG. 3.

Figure 3:
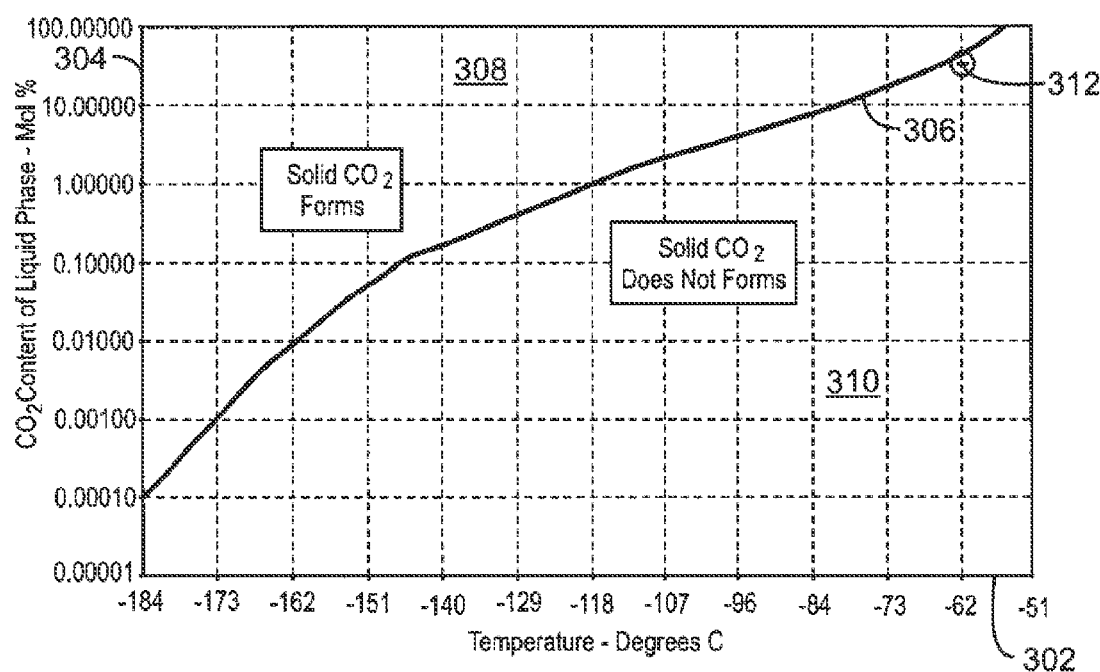
FIG. 3 is a plot of the freezing conditions used to form solid $CO_2$ in a mixture with a hydrocarbon.

FIG. 3 is a plot 300 of the freezing conditions used to form solid $CO_2$ in a mixture with a hydrocarbon. In the plot 300, the x-axis 302 represents the temperature of the mixture in degrees Fahrenheit, while the y-axis 304 represents the $CO_2$ content of the liquid phase in mol %. The line 306 on the plot 300 represents a division between a first region 308 in which solid $CO_2$ forms, and a second region 310 in which solid $CO_2$ does not form. At temperatures of about −62° C., solid $CO_2$ forms from a 70% I 30%: $CO_2$ I ethane mixture as shown at point 312 in the plot 300. Ethane, however, does not freeze, but will be either a vapor or liquid, depending on the pressure, temperature, and residual $CO_2$ level. The solid will be nearly pure $CO_2$, resulting in a separation.

Figure 4:
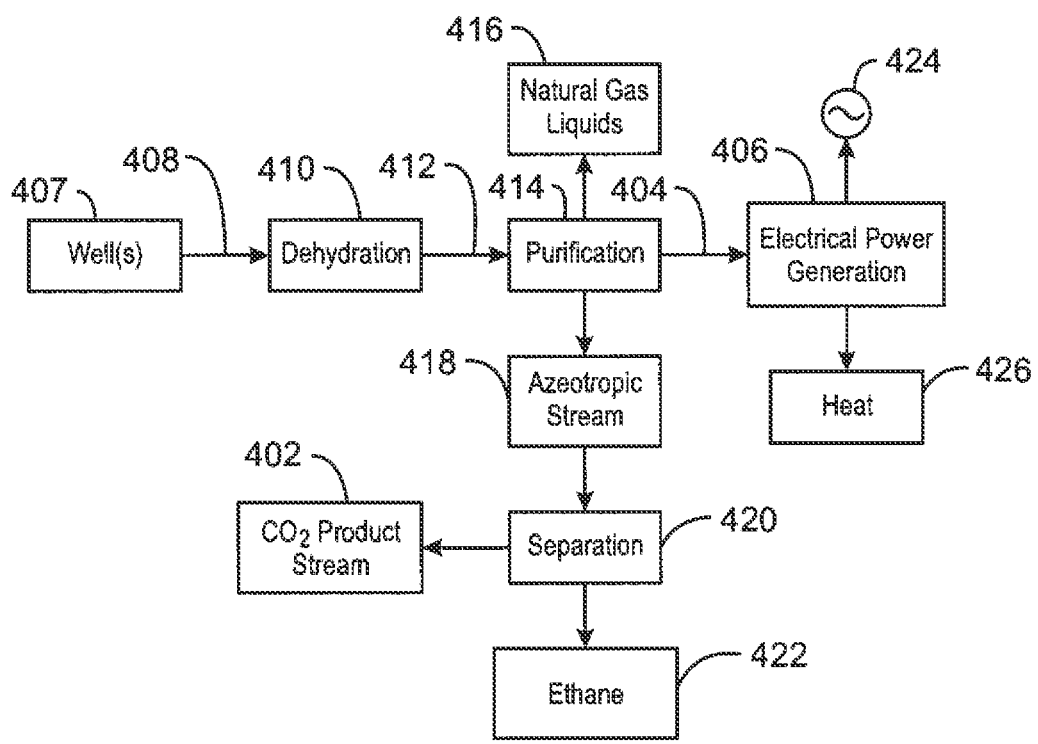
FIG. 4 is a block diagram of a system that can be used to separate $CO_2$ and ethane as part of a natural gas purification process.

FIG. 4 is a block diagram of a system 400 that can be used to isolate a $CO_2$ product stream 402 as part of a natural gas purification process. The purified natural gas 404 may, for example, be used to power an electrical generation system 406. The system 400 is not limited to the blocks shown, but may include any number of configurations, including, for example, providing a purified natural gas stream 404 to other customers through a commercial pipeline.

In the system 400, one or more production wells 407 can be used to produce a raw natural gas stream 408. The raw natural gas stream 408 may include a substantial amount of carbon dioxide, ethane, and other components. In some embodiments, the raw natural gas stream 408 may have a low-BTU content, e.g., between about 500 and 950 BTUs per standard cubic foot.

The raw natural gas stream 408 can be fed to a dehydration unit 410 in which water vapor may be removed using glycol dehydration, desiccants, or a Pressure Swing Adsorption (PSA) unit, among other processes. The dehydration unit 410 is not limited to the arrangement shown, but may be included at any number of points in the system 400, or eliminated if not needed. Generally, dehydration is used to prepare the natural gas for cryogenic separation by removing water, which could freeze and plug the systems.

The dehydrated stream 412 may be fed to a purification system 414, which may use any number of processes to remove contaminates, including natural gas liquids (NGL) 416, carbon dioxide, and other acid gases. The purification system 414 may include a cryogenic distillation unit, for example, using a Ryan-Holmes process. Other cryogenic distillation techniques may be used, such as the controlled freeze zone (CFZ™) technology available from Exxon Mobil. Both of these cryogenic processes can generate an azeotropic stream 418 that includes ethane and $CO_2$, as well as other compounds. In various embodiments, any number of other techniques that generate a liquid acid gas stream may also be used for purification, such as a warm gas processing system. In addition to removing the azeotropic stream 418, the purification system 414 may also remove at least a portion of the higher carbon number hydrocarbons, e.g., $C_2$ and higher, for example, by fractionation. The higher carbon number hydrocarbons may be combined to form a NGL stream 416, among others, which may also be marketed as a product. However, as discussed above, the formation of the azeotrope will cause a portion of ethane will remain in the azeotropic stream 418 as a mixture with the $CO_2$.

The azeotropic stream 418 from the purification may be further processed to generate the $CO_2$ stream 402, which may be used for enhanced oil recovery, commercial sales, or other purposes. The processing is performed in a separation system 420 that flashes the azeotropic stream 418 to generate an ethane stream 422, which can be combined back into the natural gas liquids 416 or added to the gas stream 404.

After purification, the gas stream 404 may be a mixture of methane and various inert gases, such as nitrogen and helium, and may include the ethane stream 422. This gas stream 404 can be directly used, for example, as a low BTU natural gas stream to power an electric power generation system 406. Other operations, such as the separation of a helium enriched stream, may also be performed prior to the usage. An electrical generation plant 406 may provide other, higher value, products for sale, including electrical power 424 to a power grid, heat 426 for other processes, or both. In some embodiments, the electrical generation plant 406 may purchase the gas stream 404 from a pipeline associated with the producer. The techniques described herein are not limited to electric power generation using low BTU streams, but may be used with any purification process in which the separation of ethane from carbon dioxide may be useful.

The system 400 described herein has a number of advantages over current technologies. For example, it produces a liquid carbon dioxide stream for easy injection, while producing a clean vapor ethane stream for sale. Further, the system 400 integrates heat demands and cooling sources to decrease the need for external refrigeration in the separation system 420. The process is based on solidifying the $CO_2$ and flashing the ethane. Since the azeotropic stream 418 is in the liquid phase, the vaporization of the azeotropic stream 418 can be used to drive the process, with the heat of vaporization of the ethane cooling the $CO_2$, and the heat of solidification from the $CO_2$ driving the vaporization of the ethane. Additional cooling or heating may be provided to balance the energy transfer.

The purification system 414 can include any number of processes that produce a liquid acid gas stream, including, for example, the Ryan-Holmes process, a bulk fractionation process, or a controlled freeze zone plant. The separation system 420 can be retrofitted onto an existing purification system 414 to have all or part of the liquid acid gas stream produced by these processes re-directed to the separation system 420 to extract higher value ethane from $CO_2$ mixtures. One example of a cryogenic separation process that may be used is shown in FIG. 5.

Cryogenic Separation Forming a Liquid Acid Gas Stream

Figure 5:
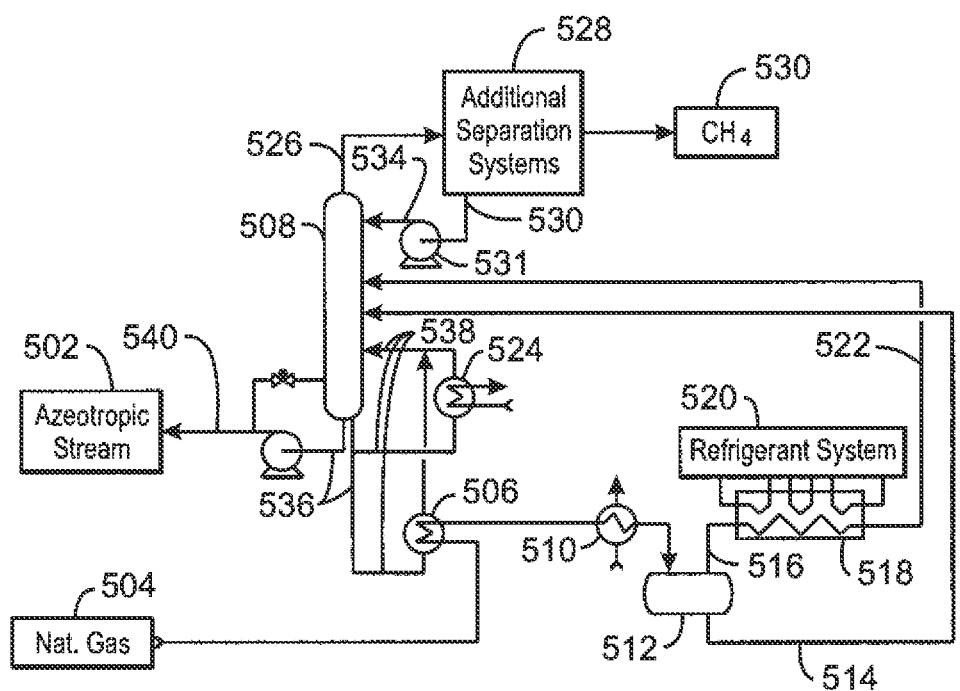
FIG. 5 is a simplified process flow diagram of a cryogenic separation system that can be used to generate an azeotropic stream.

FIG. 5 is a simplified process flow diagram of a cryogenic separation system 500 that can be used to generate an azeotropic stream 502. In the separation system 500, a natural gas stream 504 can be cooled by providing some of the heat used by the process, for example, by being passed through a heat exchanger 506 to provide heat for reboiler service on a cryogenic fractionation column 508. The natural gas stream 504 can be further chilled in another heat exchanger 510, and then flashed into a flash drum 512. The bottoms stream 514 from the flash drum 512 can be sent into the cryogenic fractionation column 508. The vapor stream 516 from the overhead of the flash drum 512 can be further cooled in a cold box 518, for example, by exchanging heat with a number of refrigerant systems 520, such as high pressure, mid-pressure, and low pressure propane chillers. The resulting stream 522 is injected into the cryogenic fractionation column 508. In addition to heating from the heat exchanger 506 on the natural gas feed stream 504, a reboiler heat exchanger 524 may provide additional heating or cooling to the cryogenic fractionation column 508.

The overhead stream 526 from the cryogenic fractionation column 508 will include the methane from the natural gas feed 504, as well as other low boiling point or non-condensable gases, such as nitrogen and helium. Additional separation systems 528, including columns, cold boxes, and the like, may be used to generate a $CH_4$ product stream 530 at a chosen purity level. A portion 530 of the overhead stream 526 may be fed to a pump 531 to be reinjected into the cryogenic fractionation column 508 as a reflux stream 534.

The bottoms stream 536 from the cryogenic fractionation column 508 can be separated into two streams. A reboiler stream 538 is heated and returned to the cryogenic fractionation column 508 to provide heating. An outlet stream 540 is removed from the bottoms stream 536 for disposal. In embodiments, this outlet stream 540 forms the azeotropic stream 502 used for the generation of the separated ethane and $CO_2$ streams, as described with respect to FIG. 6.

Separation of $CO_2$ from an Azeotropic Stream

Figure 6:
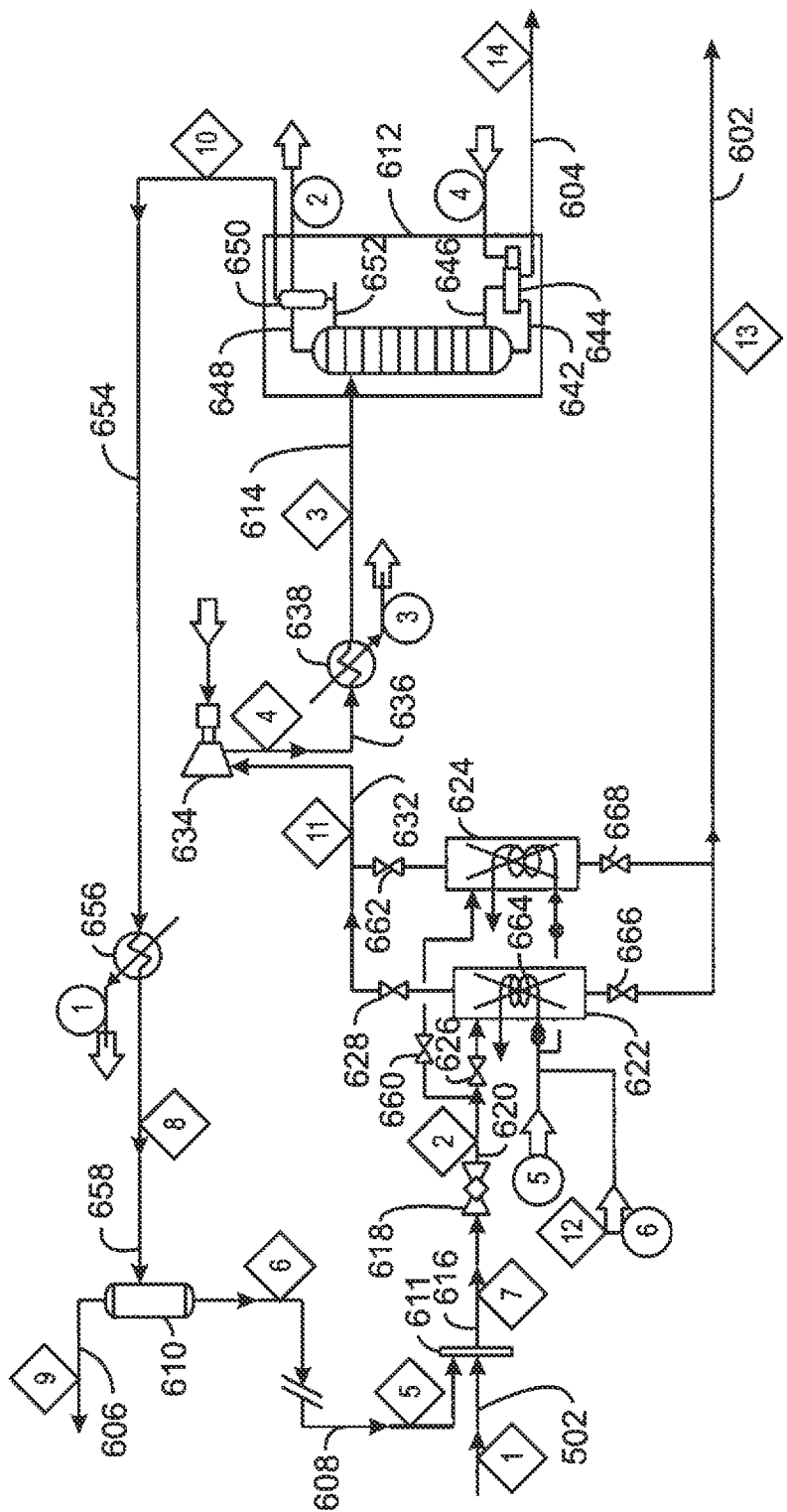
FIG. 6 is a simplified process diagram of a separation system for separating $CO_2$ from an azeotropic mixture with ethane.

FIG. 6 is a simplified process diagram of a separation system 600 for separating $CO_2$ from an azeotropic mixture with ethane. Tables 1 and 2 provide details of a simulation example of the process. The numbers in the diamonds in FIG. 6 correspond to the like numbered columns in Table 1, which show the properties and compositions of the labeled point. The separation system 600 shown in FIG. 6 has a number of advantages over conventional technology. For example, the ethane and $CO_2$ can be substantially separated, with minimal residual contamination or hydrocarbon loss. The $CO_2$ stream 602 is recovered as a pressurized liquid, allowing it to be pumped to disposal pressure. This facilitates EOR or geo-sequestration at minimum power. The ethane stream 604 is recovered as a chilled liquid, and can be either heated and revaporized to provide refrigeration for the process, or processed to a liquid ethane product by further chilling.

The separation system 600 can be substantially heat-integrated, minimizing external heat or power requirements. A separation of a methane stream 606 from the ethane stream 604 is performed at the same time as the separation of ethane and $CO_2$. This separation eliminates a need for an additional demethanizer downstream. The methane stream 606 is returned to the CFZ or bulk fractionation column, for example, being combined with the natural gas stream 504 discussed with respect to FIG. 5.

The separation system 600 begins when the azeotropic stream 502 is blended with a liquids stream 608 from a methane separator 610. The mixing element 611 can be a static mixer, or merely a pipe joint coupling the two streams 502 and 608. In this example, the $CO_2$ content of the azeotropic stream 502 is about 70%, which is very close to the azeotropic composition at 4,137 kPa (600 psia). In embodiments in which the $CO_2$ content is lower, the azeotropic stream 502 can be directed to the ethane fractionator 612, e.g., mixed with the fractionator feed stream 614, to remove as much ethane as possible by conventional fractionation, prior to solid $CO_2$ formation. In embodiments in which the $CO_2$ content of the azeotropic stream 502 is greater than 70%, another fractionator could be included upstream of the separation system 600 to generate the azeotropic stream 502 as an overhead product by removing as much $CO_2$ as possible prior to using the subject technology. In both cases, the final concentration of the $CO_2$ and ethane in the azeotropic stream 502 after separation is limited by the azeotrope, e.g., to around 70% $CO_2$ and 30% ethane at 4,137 kPa (600 psia).

From the mixing element 611, a combined feed stream 616 is passed through an isoenthalpic expansion element 618, such as a Joule-Thompson valve. The expanded stream 620 is chilled as a result of the flashing, causing the $CO_2$ to solidify as the ethane and some $CO_2$ vaporizes. The expanded stream 620 is passed into one of two solid accumulation vessels 622 or 624. In this example, the inlet valve 626 to and outlet valve 628 from the first solid accumulation vessel 630 are open, allowing the $CO_2$ solids to be captured in the vessel, while the ethane rich vapor stream 632 exits from the top of the vessel.

The ethane rich vapor stream 632 is compressed in a raw ethane compressor 634. The compressed feed stream 636 is cooled in an ethane fractionator feed cooler 638 to form the fractionator feed stream 614. The fractionator feed stream 614 is injected into a column 640 in the ethane fractionator 612. A bottom stream 642 from the column 640 is heated in a reboiler 644, before being returned to the column 640 as a heated stream 646. A portion of the bottom stream 642 is taken from the reboiler 644 as the ethane stream 604.

The overhead stream 648 from the column 640 is sent to a reflux condenser and reflux accumulator tank 650. A liquid stream is taken from the bottom of the reflux accumulator tank 650 and injected into the top of the column 640 as a reflux stream 652. The vapor stream from the top of reflux accumulator tank 650 is removed as a $CO_2$/ethane recycle stream 654. The $CO_2$/ethane recycle stream 654 is chilled in a recycle condenser 656, forming a liquid recycle stream 658. The liquid recycle stream 658 is flashed in the methane separator 610. As discussed, the liquid stream 608 from the methane separator 610 is combined with the azeotropic mixture 502. The gas from the top of the methane separator 610 forms the methane stream 606, which can be returned to the cryogenic separation process.

TABLE 1

Example Process Data

|  | 1 | 2 | 3 | 4 | 5 | 7 | 8 |
|---|---|---|---|---|---|---|---|
| Temperature - Deg C. | −62 | −91 | −52 | 15 | −62 | −62 | −62 |
| Pressure - kPa | 689.5 | 151.7 | 779.1 | 848.1 | 689.5 | 689.5 | 689.5 |
| Flowrate (kgmole/hr) | 453.7 | 614.8 | 313.3 | 313.3 | 161.1 | 614.8 | 185.3 |
| Flowrate (k SM3/D) | 257.7 | 349.0 | 177.9 | 177.9 | 91.4 | 349.0 | 105.2 |
| Methane Mole Fraction | 0.01000 | 0.01203 | 0.02362 | 0.02362 | 0.01776 | 0.01203 | 0.03995 |
| Ethane Mole Fraction | 0.30000 | 0.32877 | 0.64518 | 0.64518 | 0.40980 | 0.32877 | 0.40000 |
| $CO_2$ Mole Fraction | 0.69000 | 0.65919 | 0.33121 | 0.33121 | 0.57243 | 0.65919 | 0.56005 |

|  | 9 | 10 | 11 | 12 | 13 | 14 |
|---|---|---|---|---|---|---|
| Temperature - Deg C. | −62 | −55 | −87 | −87 | 8 | −39 |
| Pressure - kPa | 689.5 | 758.5 | 151.7 | 151.7 | 4240.4 | 792.9 |
| Flowrate (kgmole/hr) | 24.2 | 185.3 | 313.3 | 301.5 | 301.5 | 128.1 |
| Flowrate (k SM3/D) | 13.9 | 105.2 | 177.9 | 171.1 | 171.1 | 72.7 |
| Methane Mole Fraction | 0.18739 | 0.03995 | 0.02362 | 0.00000 | 0.00000 | 0.00000 |
| Ethane Mole Fraction | 0.33493 | 0.40000 | 0.64518 | 0.00000 | 0.00000 | 0.99978 |
| $CO_2$ Mole Fraction | 0.47768 | 0.56005 | 0.33121 | 1.00000 | 1.00000 | 0.00022 |

During operations, the first solid accumulation vessel 622 fills with solid $CO_2$. When enough solid $CO_2$ has accumulated in the first solid accumulation vessel 630, the flashing liquid can be sent to a second solid accumulation vessel 624 by opening the inlet valve 660 and outlet valve 662 on the second solid accumulation vessel 624 and closing the inlet valve 626 to vessel 622. The first solid accumulation vessel 622 can be heated by an internal heating coil 664, sublimating some $CO_2$ to displace any remaining hydrocarbons. Once the hydrocarbons are displaced, the outlet valve 628 on the first solid accumulation vessel 622 can then be closed, allowing the pressure to rise until the $CO_2$ can melt, forming liquid $CO_2$. When the $CO_2$ has finished melting, the drainage valve 666 at the bottom of the first solid accumulation vessel 622 can be opened to allow the $CO_2$ stream 602 to be drained for sales or disposal. Once the second solid accumulation vessel 624 has a sufficient amount of $CO_2$, the process can be repeated. After hydrocarbons are purged, the vessel is isolated, and the $CO_2$ is melted, a drainage valve 668 can be opened to drain the $CO_2$ stream 602 from the second solid accumulation vessel 624.

The energy balance of the process is shown in Table 2. The numbers in column 2 correspond to the circled numbers in FIG. 6. As can be seen from the values, the total heat released by the process is 2 MW, while the total heat adsorbed by the process is 2.21 MW, for a net heat input of 0.21 mW. At least a portion of that heat may be provided by cooling the initial natural gas feed 504 to the cryogenic separation process. In addition to the 352 kW used to power the raw ethane compressor 634, other energy may be required to provide refrigeration make-up.

TABLE 2

| | Heat Balance | | |
|---|---|---|---|
| Heat Sources: | 1 Recycle Condenser Q | 595 | kW |
| | 2 Ethane Splitter Cond Q | 595 | kW |
| | 3 Splitter Feed Cooler Q | 811 | kW |
| | TOTAL: | 2 | MW |
| Heat Sinks: | 4 Ethane Splitter Reboiler Q | 709 | kW |
| | 5 $CO_2$ Sensible Heating Q | 741 | kW |
| | 6 $CO_2$ Heat of Fusion Q | 762 | kW |
| | TOTAL: | 2.21 | MW |
| Power Requirements: | 7 Raw Ethane Compressor | 352 | kW |

Method for Separating $CO_2$ and Ethane

Figure 7:
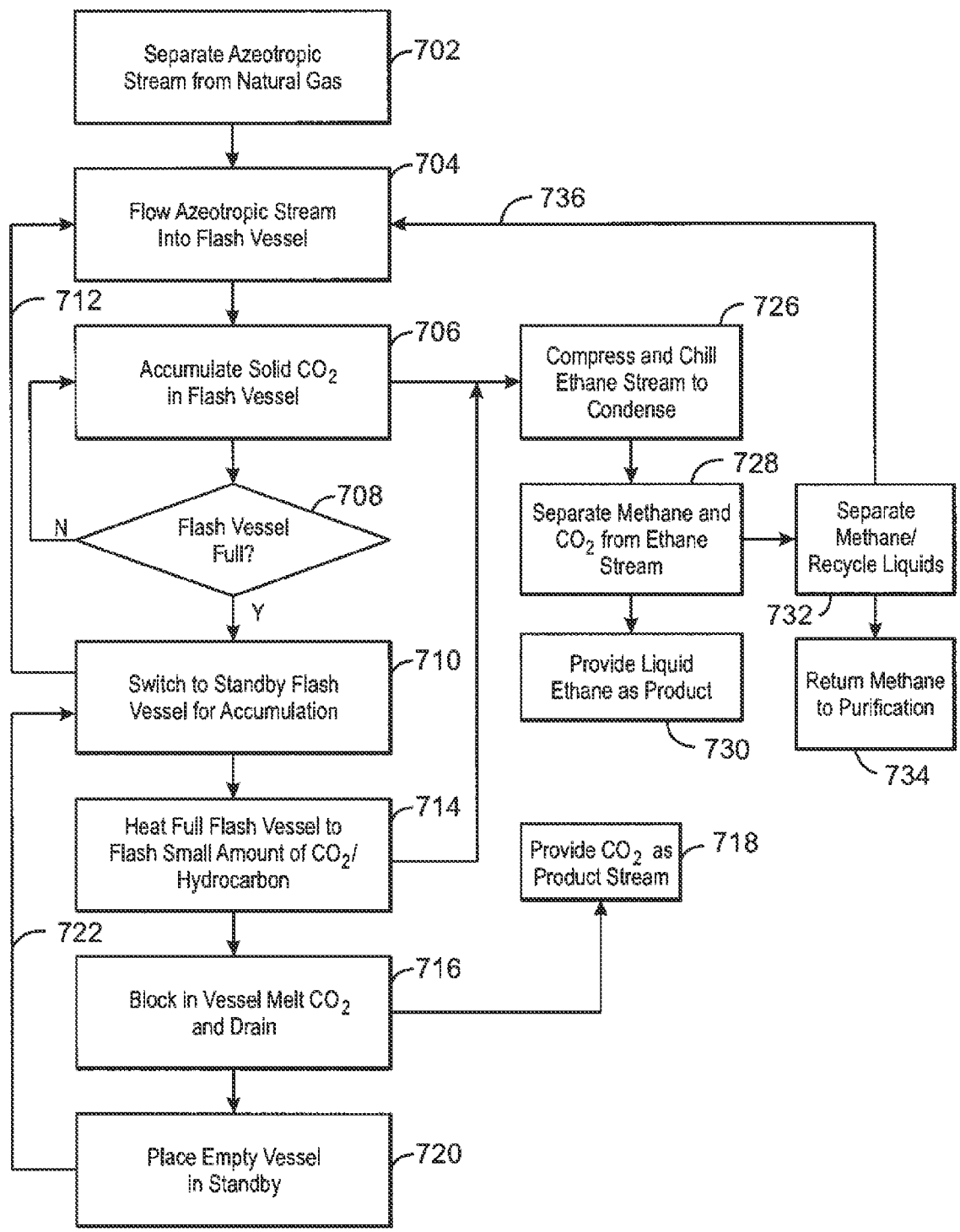
FIG. 7 is a block diagram of a method for generating a $CO_2$ product stream and an ethane stream from an azeotropic stream using a flashing process.

FIG. 7 is a block diagram of a method 700 for generating a $CO_2$ product stream and an ethane stream from an azeotropic stream using a flashing process. The method 700 begins at block 702 with the separation of an azeotropic stream from a natural gas product. The azeotropic stream may be isolated using a cryogenic separation process as described with respect to FIG. 4. However, any separation process that generates an azeotropic stream may be used. If the azeotropic stream is generated as a gas, a chilling and condensation step can be added to condense the gas prior to separation. At block 704, the azeotropic stream is flowed through a flash valve into a flash vessel to solidify $CO_2$ and flash ethane, as described with respect to FIG. 6. At block 706, the solidified $CO_2$ is allowed to accumulate in the flash vessel. At block 708, a determination is made as to whether the flash vessel is full. If so, at block 710, accumulation of the solid $CO_2$ is switched to an empty flash vessel that had been on standby. Process flow with the new flash vessel returns to block 704 to continue with the flashing, as indicated by an arrow 712.

The process continues for the full flash vessel at block 714, where heat is added to sublime a small portion of the $CO_2$, e.g., about less than about 5%, to release any trapped hydrocarbons. After the sublimation, at block 716, the vessel is blocked in and the temperature and pressure are allowed to rise until the $CO_2$ melts. The vessel is drained and the liquid $CO_2$ is provided as a product at block 718. The empty flash vessel is then placed in standby at block 720, and process flow for the empty vessel returns to block 710 to wait for the current accumulation vessel to fill, as indicated by an arrow 722.

The ethane that is flashed off to create the solid $CO_2$ at block 706 is combined with the sublimed $CO_2$ and hydrocarbon from block 714, as indicated by arrows 724. At block 726, the combined stream is compressed and chilled to form a raw liquid ethane stream. At block 728, the raw liquid ethane stream is stripped to remove a contaminated stream that contains methane and $CO_2$ from the ethane. The purified ethane stream is provided as a product at block 730. Methane is separated from the contaminated stream as a gas at block 732, and, at block 734. The remaining material, which includes ethane and $CO_2$, is returned to block 704 to be combined with the azeotropic stream for flashing in the flash vessel, as indicated by an arrow 736.

Embodiments

Embodiments as described herein may include any combinations of the elements in the following numbered paragraphs:

1. A method for separating a mixed ethane and $CO_2$ stream, including:
   generating a liquid stream including ethane and $CO_2$;
   passing the liquid stream through a flash valve into an accumulation vessel, forming a gas that is enhanced in ethane, and forming solid $CO_2$;
   accumulating the solid $CO_2$ in the accumulation vessel; and
   removing the gas from the top of the accumulation vessel.

2. The method of paragraph 1, including cryogenically separating the liquid stream from a natural gas feed stream.

3. The method of paragraphs 1 or 2, including switching to a second accumulation vessel when the accumulation vessel is substantially filled with solid $CO_2$.

4. The method of paragraph 3, including heating the solid $CO_2$ in the accumulation vessel to sublime a fraction of the $CO_2$, removing at least a portion of hydrocarbons trapped in the solid $CO_2$.

5. The method of paragraphs 1, 2, or 3, including
   blocking in the accumulation vessel;
   heating the accumulation vessel; and
   and allowing the temperature and pressure to rise in the accumulation vessel until the $CO_2$ melts and forms liquid $CO_2$.

6. The method of paragraph 5, including:
   draining the liquid $CO_2$ from the accumulation vessel; and
   providing the liquid $CO_2$ as a product stream.

7. The method of any of paragraphs 1-3, or 5, including:
   condensing the ethane stream;
   stripping the ethane stream to remove a contaminated ethane stream that includes methane and $CO_2$;
   separating methane from the contaminated ethane stream; and combining the contaminated ethane stream with the liquid stream.

8. The method of paragraph 7, including returning the methane to a separate purification unit.

9. The method of any of paragraphs 1-3, 5, or 7, including fractionating the liquid stream prior the flash valve to remove excess $CO_2$ and form an azeotropic mixture.

10. The method any of paragraphs 1-3, 5, 7, or 9, including fractionating the liquid stream prior to the flash valve to remove excess ethane and form an azeotropic mixture.

11. A system for separating a mixed stream of $CO_2$ and ethane, including:
   a flash valve configured to isoenthalpically flash the mixed stream forming solid $CO_2$ and a vapor stream enhanced in ethane; and
   an accumulation vessel configured to capture the solid $CO_2$.

12. The system of paragraph 11, including a cryogenic separation system configured to form the mixed stream from a natural gas feed.

13. The system of paragraphs 11 or 12, including a compressor and a chiller configured to recondense the vapor stream forming a raw ethane stream.

14. The system of paragraph 13, including a fractionator configured to separate a contaminated ethane stream including ethane and $CO_2$ from the raw ethane stream.

15. The system of paragraph 14, wherein the fractionator is configured to isolate a liquid ethane product stream.

16. The system of paragraph 14, including a flash vessel configured to separate methane from the contaminated ethane stream.

17. The system of any of paragraphs 11-13, including a plurality of accumulation vessels, wherein each sequential accumulation vessel is configured to begin accumulating solid $CO_2$ when a previous accumulation vessel is substantially filled with $CO_2$.

18. The system of any of paragraphs 11-13, or 17, including a heater configured to warm solid $CO_2$ in the accumulation vessel and drive off trapped hydrocarbon.

19. The system of any of paragraphs 11-13, 17, or 18, wherein the accumulation vessel is configured to reach a temperature and pressure that allows the solid $CO_2$ to melt, forming a liquid $CO_2$ product stream.

20. The system of any of paragraphs 11-13, or 17-19, wherein the accumulation vessel is configured to form liquid $CO_2$ from the solid $CO_2$.

21. A method for purifying a natural gas stream including:
dehydrating the natural gas stream;
cryogenically separating the natural gas stream into a methane rich fraction, a natural gas liquids fraction, and an azeotropic stream in a cryogenic purification system;
flashing the azeotropic stream to form solid $CO_2$ and an ethane enriched vapor stream;
removing the solid $CO_2$ from the ethane enriched vapor stream in an accumulation vessel; and purifying the ethane enriched vapor stream to form a liquid ethane product.

22. The method of paragraph 21, including:
separating a recycle stream including $CO_2$, ethane, and methane from the ethane enriched vapor stream;
separating a methane stream from the recycle stream; and returning the methane stream to the cryogenic purification system.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for separating a mixed stream comprising ethane and $CO_2$, comprising:
providing a mixed stream comprising ethane and $CO_2$;
generating a liquid stream comprising an azeotropic mixture of ethane and $CO_2$ from the mixed stream;
passing the liquid stream through a flash valve into a first accumulation vessel, forming a gas that is enhanced in ethane and forming solid $CO_2$;
accumulating the solid $CO_2$ in the first accumulation vessel;
heating the first accumulation vessel;
allowing the temperature and pressure to rise in the first accumulation vessel until the $CO_2$ melts and forms liquid $CO_2$;
removing the gas from the top of the first accumulation vessel;
condensing the gas that was removed from the top of the accumulation vessel to form a condensed gas;
stripping the condensed gas to remove a contaminated ethane stream that comprises ethane, methane, and $CO_2$;
separating methane from the contaminated ethane stream to form a remainder stream that comprises ethane and $CO_2$; and
combining the remainder stream with the liquid stream.

2. The method of claim 1, wherein the mixed stream is provided by separating the mixed stream from a natural gas feed stream.

3. The method of claim 1, further comprising switching to a second accumulation vessel when the first accumulation vessel is filled with solid $CO_2$.

4. The method of claim 1, wherein heating the solid $CO_2$ in the first accumulation vessel causes sublimation of at least a fraction of the $CO_2$, removing at least a portion of hydrocarbons trapped in the solid $CO_2$.

5. The method of claim 1, further comprising
closing an inlet valve to the first accumulation vessel prior to heating of the first accumulation vessel; and
closing an outlet valve to the first accumulation vessel prior to allowing the temperature and pressure to rise in the first accumulation.

6. The method of claim 5, comprising:
opening the outlet valve to the first accumulation vessel and draining the liquid $CO_2$ from the first accumulation vessel; and
providing the liquid $CO_2$ as a product stream.

7. The method of claim 1, further comprising sending the methane to a separate purification unit.

8. The method of claim 1, comprising fractionating the mixed stream to remove $CO_2$ and generate the azeotropic mixture comprising ethane and $CO_2$.

9. The method of claim 1, comprising fractionating the mixed ethane and CO2 stream to remove ethane and generate the azeotropic mixture comprising ethane and CO2.

10. The method of claim 1, wherein the azeotropic mixture comprises 70% $CO_2$ and 30% ethane at about 600 psia.

* * * * *